United States Patent [19]

Cavalli

[11] Patent Number: 4,545,216

[45] Date of Patent: Oct. 8, 1985

[54] MULTI-PURPOSE DEVICE INCORPORATING A FREEZING CYCLE, MORE PARTICULARLY FOR PRODUCING ICE CREAM AND SIMILAR FROZEN PRODUCTS

[76] Inventor: Alfredo Cavalli, 9, Via Galileo Galilei, Pessano Con Bornago, Milan, Italy

[21] Appl. No.: 567,946

[22] Filed: Jan. 4, 1984

[30] Foreign Application Priority Data

Jan. 14, 1983 [IT] Italy .............................. 20467/83[U]

[51] Int. Cl.[4] ............................................. A23G 9/00
[52] U.S. Cl. .................................... 62/343; 366/279; 366/601
[58] Field of Search .................. 62/342, 343; 366/279, 366/601

[56] References Cited

U.S. PATENT DOCUMENTS

| | | | |
|---|---|---|---|
| 3,304,737 | 2/1967 | Strutynski | 62/342 X |
| 3,452,555 | 7/1969 | Thurman et al. | 62/342 X |
| 3,548,280 | 12/1970 | Cockroft | 366/601 X |
| 3,951,351 | 4/1976 | Ernster et al. | 366/601 X |
| 3,952,538 | 4/1976 | Warlick | 62/342 |
| 4,070,957 | 1/1978 | Korekawa et al. | 62/342 X |

Primary Examiner—William E. Tapolcai
Attorney, Agent, or Firm—Cohen, Pontani & Lieberman

[57] ABSTRACT

A multi-purpose device comprises a freezing tank in which a two speed driven shaft is rotatably held. A whisk or whipping tool is secured to the shaft near the bottom of the tank, and a freezing tool is removably secured in rotation to the shaft, when desired.

The device can combine the two basic functions of the complete process of producing ice cream: whipping and freezing, in the same tank.

11 Claims, 3 Drawing Figures

MULTI-PURPOSE DEVICE INCORPORATING A FREEZING CYCLE, MORE PARTICULARLY FOR PRODUCING ICE CREAM AND SIMILAR FROZEN PRODUCTS

The invention refers to a multi-purpose device incorporating a freezing cycle, particularly suitable for producing ice cream and even more particularly for producing ices, sorbets and similar frozen products for consumption a short time after they have been prepared.

As is known, there are two basic operations in the production of ices, i.e. whisking or whipping the ingredients and freezing them after whisking. Each operation is performed in a separate, suitable device.

As is also known, in a mixer the ingredients are comminuted, ground and whipped by a whisk which is normally driven in rotation at speeds between 1500 and 2800 rpm. In the tank of an ice-cream machine, on the other hand, the whipped ingredients are continuously mixed by a suitable blade which is rotated at 50-100 rpm. The whipped ingredients in the tank are also subjected to continuous, suitable refrigeration which, in co-operation with the rotating blade, gradually converts them into ice cream or another similar frozen product.

This method has well-known disadvantages. At least two physically and structurally independent devices are required, each needing a separate set of accessories and a separate space when stored or transported or used. Another disadvantage is the laborious nature of the operations resulting from the use and maintenance of two very different devices.

The main aim of the invention is to provide a device for producing ice cream and other similar frozen products, the device having structural and operating characteristics which obviate the aforementioned disadvantages of the prior art.

This aim, and others which will appear more clearly from the following description, are achieved by a device of the kind in question, comprising a freezing tank and a mechanically driven shaft at least part of which extends in the tank and characterized in that it comprises:

(a) a whisk or whipping tool secured in rotation to the shaft near the bottom of the tank, (b) a freezing tool having at least one mixing blade removably secured in rotation to the shaft, the blade being positioned substantially in contact with the bottom and the side wall of the tank, and (c) a motor for driving the shaft in rotation at two speeds, i.e. one speed for rotating the whisk alone and another speed for rotating at least the freezing tool.

Advantageously, in a preferred embodiment, the device is also characterised in that the motor is a two-speed motor and in that the device comprises means for switching the motor from one speed to the other and vice versa.

Other features and advantages will appear more clearly from the following description of an embodiment of a device for producing ices according to the invention, given hereinafter with reference to the accompanying drawings, which are given by way of example only and in which.

Figure 1:
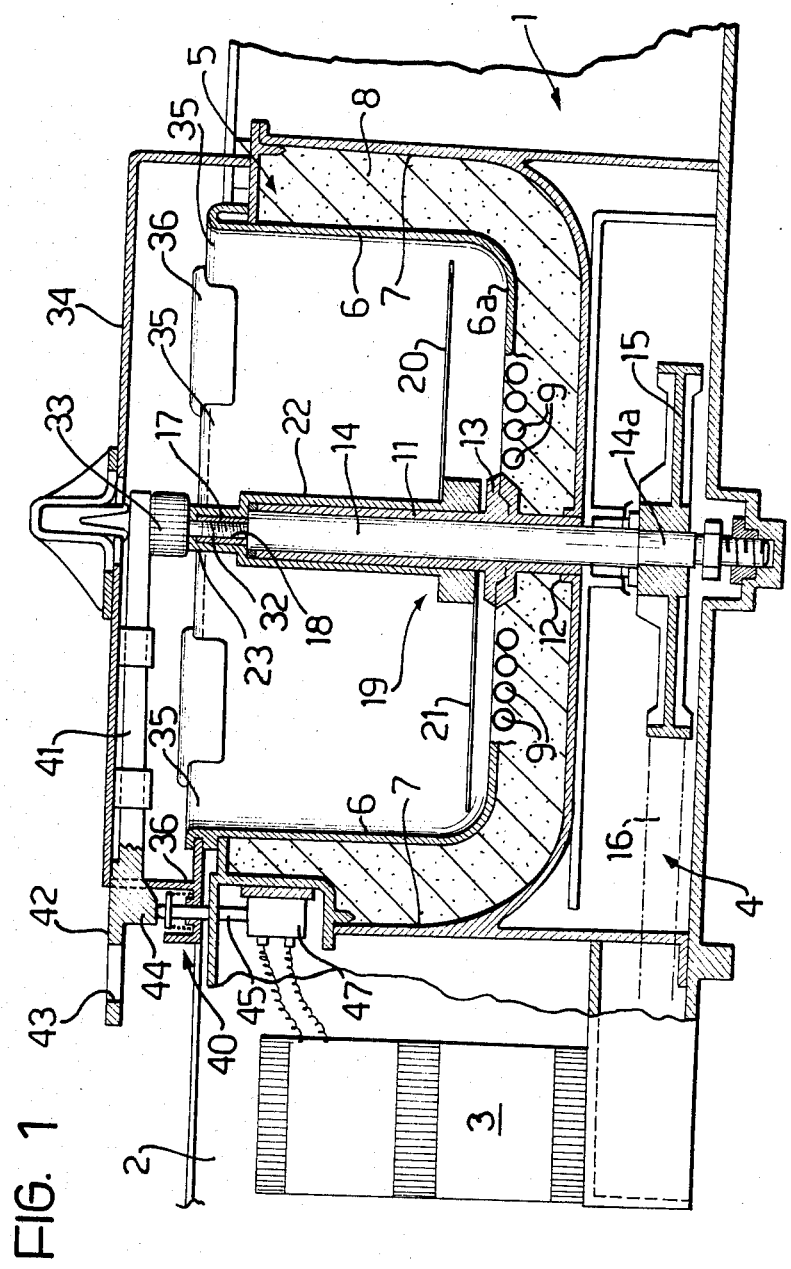
FIG. 1 is a diagram, partly in section, of a device for producing ice cream according to the invention, in one operating state.
Figure 2:
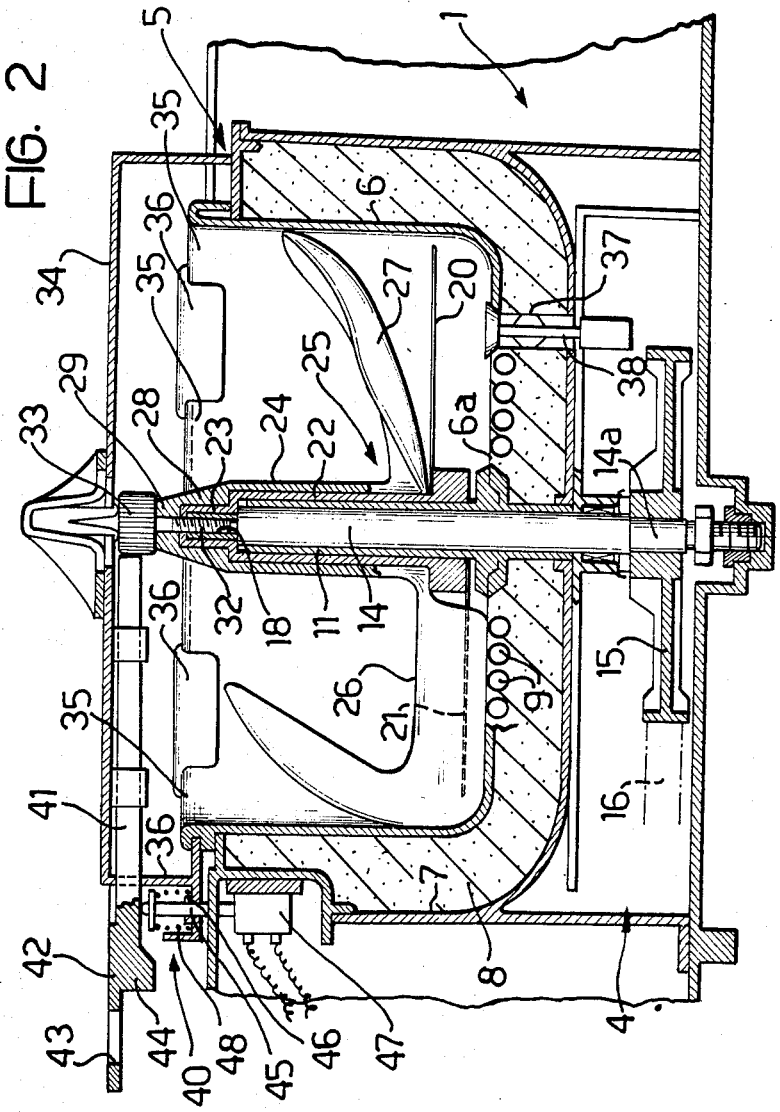
FIG. 2 is a diagram in partial section of the device in FIG. 1 in a different operating state.
Figure 3:
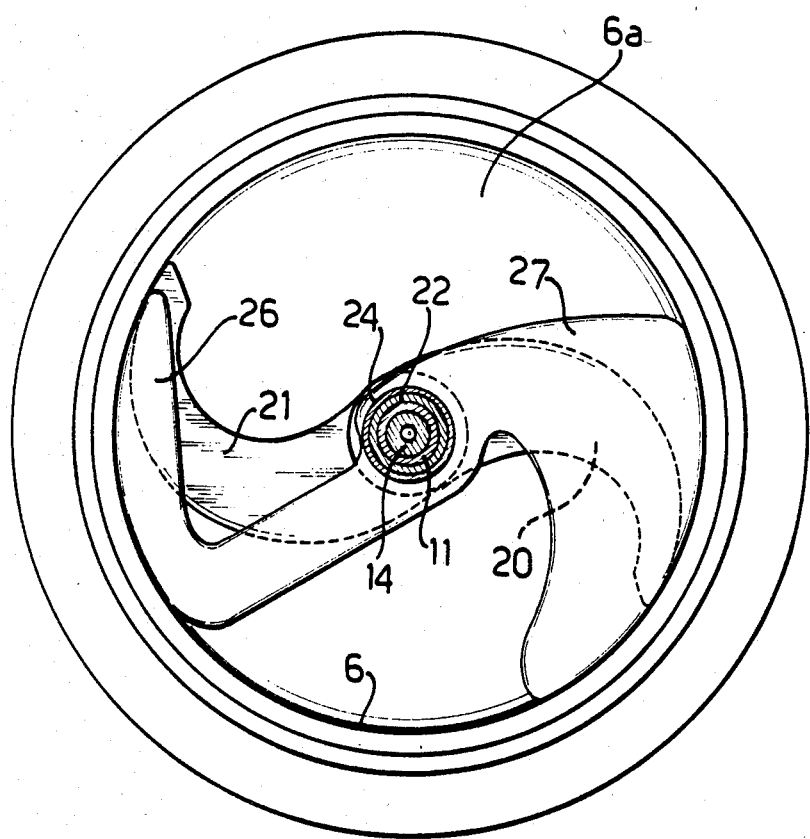
FIG. 3 is a diagrammatic plan view of a detail of the device in FIG. 2.

As shown in the drawings, a device for producing ice cream according to the invention comprises a box-like member 1 defining a cavity 2 for receiving a motor 3 and accessories (known and therefore not shown); the device also comprises a base 4, likewise box-like, on which a freezing tank 5 is secured by conventional means (not shown). More particularly, tank 5 is of the kind comprising a double inner wall 6 and outer wall 7 which between them define a space filled with suitable heat-insulating material, indicated at 8. Ducts 9 supplying a refrigerating liquid and communicating with a freezing cycle (conventional and therefore not shown) are held in the space, substantially in contact with the inner wall 6.

Reference 11 denotes a sleeve made of heat-insulating material and extending axially into tank 5 through a hole 12 formed at the center in its bottom.

The sleeve, which opens into tank 5 and into base 4, is secured by a collar (or flange) portion 13 to the bottom 6a of the inner wall 6 of tank 5.

A mechanically driven shaft 14 is coaxially and rotatably held in sleeve 11. One end 14a of the shaft projects into base 4, where it is connected to motor 3 by a suitable transmission, indicated by way of example by a pulley 15 and transmission belt 16 in the drawings.

At its other end, shaft 14 has a portion 17 projecting above sleeve 11 and having a square cross-section. Portion 17 has an axial threaded bore 18.

A mixer 19 comprises a pair of blades 20, 21 of arcuate cross-section borne at one end of a tubular shaft 22, from which the blades extend radially from diametrically opposite positions.

Shaft 22 is rotatably and coaxially secured to sleeve 11 and is positioned for operation on it so that blades 20, 21 are near the bottom 6a of tank 5.

At its other end, shaft 22 is secured in rotation to shaft 14. At its last-mentioned end, shaft 11 has a portion 23 having a square cross-section matching the square cross-section of portion 17 and coupled and secured in rotation thereto.

Of course, the coupling between shaft 22 and shaft 14 can be of any technically equivalent kind.

Shaft 24 of a freezing device 25 is coaxially secured to shaft 22 so that the whipped ingredients in tank 5 can be continuously mixed during freezing. Preferably device 25 is of the kind comprising two mixing blades 26, 27 having a shape and cross-section so as simultaneously to mix the ingredients amd disengage them from the inner wall 6 and the bottom 6a.

Shaft 24 has conventional means for securing it in rotation to tubular shaft 22 and consequently to shaft 14. In a preferred but non-limitative embodiment, the aforementioned securing in rotation is brought about by coupling a top part 28 of shaft 24 to the top part 23 of shaft 22. More particularly, portion 28 has a square inner cross-section matching the square cross-section of portion 23.

The free end 29 of portion 28 has a predetermined thickness covering the free end of portion 23.

A screwthreaded spindle 32 extending through end portions 23, 28 of shafts 22, 24 is in threaded engagement with the threaded bore 18 of shaft 14. Spindle 32 is actuated by a knob 33 which co-operates therewith to lock and removably secure tools 19 and 25 in the operating position. Tank 5 is closed at the top by a lid 34, to which it is preferably coupled by a substantially bayonet-type securing system. To this end, according to the preferred embodiment, tank 5 at the top has four hooked projections 35 disposed in diametrically opposite positions with their hooks facing the exterior of the tank. Lid 34 has similar matching hooked projections 36 in diametrically opposite positions on its periphery.

Advantageously, tank 5 has a discharge aperture 37 formed at the bottom of the tank and controlled by a disc-type solenoid valve 38.

The device according to the invention, therefore, can combine the two basic functions of the complete process of producing ice cream or similar frozen products as follows. The mixer 19 is secured by itself on shaft 14, after which the chosen ingredients placed in tank 5 are whipped by rotating shaft 14 at the maximum speed of 1500-2800 rpm allowed by motor 3.

When whipping is complete, motor 3 is stopped and the tubular shaft 24 of the freezing device 25 is secured to shaft 22 of mixer 19.

After the two tools have been locked in position by knob 33, shaft 14 is driven in rotation at a speed of 50-100 rpm, i.e. the minimum speed allowed by motor 3.

At this low speed, mixer 19 is completely inert towards the ingredients being frozen. However, according to a preferred embodiment, tool 25 is mounted on shaft 22 so that its blades 20, 21 are covered by blades 26, 27.

A safety device (general reference numeral 40) is provided to prevent shaft 14 accidentally being rotated at the maximum speed when secured to tool 25. Device 40 mainly comprises a rod-like slider 41 rotatably held by lid 34 and extending radially thereto. Slider 41 has an end portion 42 projecting from the peripheral edge of lid 34 and having an engagement means, e.g. a shaped through aperture 43. In portion 42, slider 41 has a substantially cam-shaped downward projection 44, which has a cross-section adapted to engage the top end of a rod 45. Rod 45 is movably guided in an aperture 46 formed in an arm 47, secured to and projecting from tank 5 and facing towards the exterior thereof. Rod 45 can move against the action of spring means 48 towards or away from a microswitch diagrammatically indicated at 47 and disposed in the motor supply circuit 3.

When tool 19 only is secured to shaft 14, the knob 33 holding the tool (FIG. 1) is at its furthest possible position from lid 34. When slider 41 is pushed towards the interior of tank 5, the slider can move into the space between knob 33 and the lid, so that cam 44 engages rod 45 and moves it downwards. As a result, microswitch 14 is closed and motor 3 can rotate at the maximum speed for whipping.

When the freezing tool 25 is secured in rotation to shaft 22, knob 33 is in its nearest possible position to lid 34 and the space between knob 33 and lid 34 is insufficient for slide 41 to pass.

Consequently, slider 41 cannot be inserted as previously and cam 44 cannot engage rod 45. The circuit for supplying motor 3 when operating at maximum speed thus remains open and motor 3 can supply only the other speed, i.e. that required by the freezing tool.

Of course, other safety devices can be used instead of the one previously described but technically equivalent thereto without thereby departing from the scope of the invention as described hereinbefore and claimed hereinafter.

I claim:

1. An apparatus for producing ice cream and similar frozen products from ingredients comprising a stationary freezing container for said ingredients having a longitudinal axis, a rotatable drive shaft disposed in said freezing container along said longitudinal axis and mounted for rotatable movement therein; two speed drive means operatively connected to said drive shaft for rotatably driving said drive shaft at a selected one of said two speeds; whipping blade shaft means rotatably mountable on said drive shaft and having whipping blade means secured thereto for simultaneous rotation therewith, said whipping blade means on said rotatably mounted whipping blade shaft means being disposed near the bottom of said container, said whipping blade shaft means being rotatably driveable at a first high speed by said drive shaft means for rotating said whipping blade means at said first high speed for whipping said ingredients; and freezing blade shaft means rotatable and removably mountable on said drive shaft and having mixing blade means secured thereto near the inner side wall and bottom of said container and disposable to cover said whipping blade means when said freezing blade shaft means is removably mounted on said drive shaft means for rotatable drive thereby, said freezing blade shaft means being rotatably driveable at a second low speed by said drive shaft means for rotating said mixing blade means at said second low speed for freezing said ingredients after said high speed whipping of said ingredients by said whipping blade means.

2. An apparatus in accordance with claim 1 wherein said drive means further comprises means for selecting between said first high speed and said second low speed in response to the presence of the freezing blade shaft means on said drive shaft.

3. An apparatus in accordance with claim 2 wherein said selecting means comprises safety means for disabling said drive means from said first high speed drive when said freezing blade shaft means is rotatably mounted on said drive shaft.

4. An apparatus in accordance with claim 1 wherein said whipping blade shaft means and said freezing blade shaft means comprise tubular shafts concentrically mountable on said drive shaft.

5. An apparatus in accordance with claim 1 wherein said whipping blade means comprises a pair of blades of arcuate cross-section extending radially from diametrically opposed positions on said whipping blade shaft means.

6. An apparatus in accordance with claim 5 wherein said mixing blade means comprises a pair of mixing blades having a shape and cross-section disposed for simultaneously mixing said ingredients and disengaging them from the inner wall and bottom of said container.

7. An apparatus in accordance with claim 1 wherein said mixing blade means comprises a pair of mixing blades having a shape and cross-section disposed for simultaneously mixing said ingredients and disengaging them from the inner wall and bottom of said container.

8. An apparatus in accordance with claim 1 wherein said first high speed substantially comprises 1500-2800 rpm.

9. An apparatus in accordance with claim 8 wherein said second low speed substantially comprises 50-100 rpm.

10. An apparatus in accordance with claim 1 wherein said second low speed substantially comprises 50-100 rpm.

11. An apparatus in accordance with claim 1 wherein said whipping blade means and said mixing blade means are of different configuration.

* * * * *